June 30, 1931. H. V. LECKIE 1,812,409
METHOD AND APPARATUS FOR PREVENTING ADHERENCE OF MOLTEN METAL
Filed Aug. 24, 1929
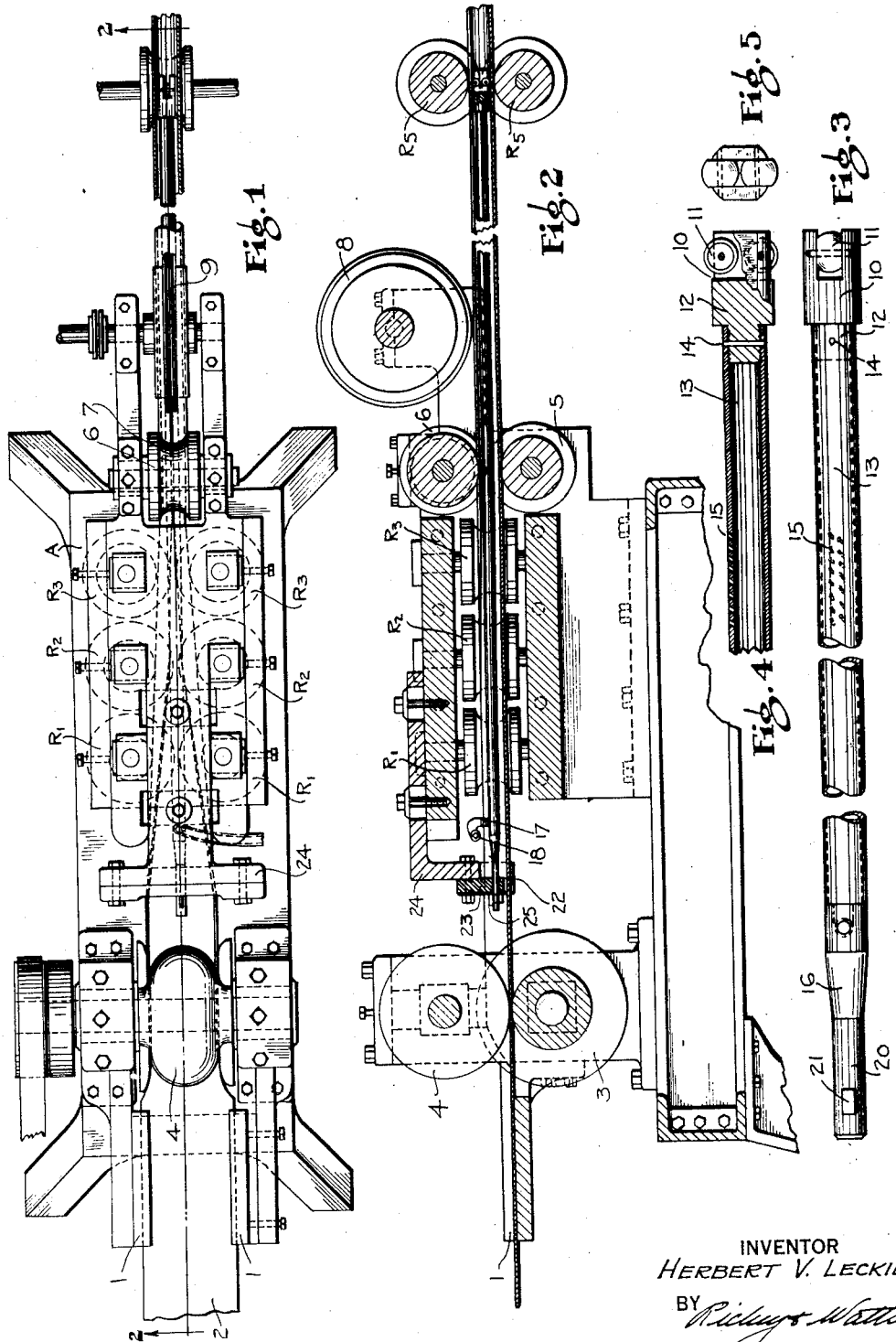
INVENTOR
HERBERT V. LECKIE.
BY
ATTORNEY Patented June 30, 1931

1,812,409

UNITED STATES PATENT OFFICE

HERBERT V. LECKIE, OF CLEVELAND, OHIO, ASSIGNOR TO STEEL AND TUBES, INC., OF CLEVELAND, OHIO, A CORPORATION OF OHIO

METHOD AND APPARATUS FOR PREVENTING ADHERENCE OF MOLTEN METAL

Application filed August 24, 1929. Serial No. 388,092.

At the present time electrical welding methods are extensively availed of in the making of metal tubing for the purpose of closing the seam cleft in the tubing. Tube making processes involving the electrical welding step usually are characterized by the movement of a strip or band of metal between fashioning or tube forming rollers which are so disposed as to gradually change the strip from a flat band to the rounded tube. At the point in the forming of the latter where the edges of the gap or seam are almost in contact, electrodes are positioned to perform the welding operations. Two electrodes in roller form are commonly employed, insulation spacing them apart so that one electrode engages one side of the cleft and the other electrode the other.

A low voltage, high amperage current is passed through the edges of the tube by the electrodes and heats the former thereby carrying out the welding operation. It is a common expedient to avail of a mandrel which is positioned in the tubing past the electrodes and this mandrel serves to roll down the metal at the seam after welding. The mandrel is supported by a rod or similar member which extends backwardly to a suitable anchorage in the apparatus.

The practice outlined in the foregoing paragraphs is accompanied by the formation of particles of molten metal which sometimes are chilled prior to coming into contact with either the inner walls of the tube or the mandrel. Under this condition small shot-like metal balls, or globules of metal, non-adherent in character are formed, and these chilled particles constitute a highly annoying factor. However, the greater nuisance associated with the formation of the molten particles lies in the fact that they very often become attached to the mandrel supporting member when molten or in adherent condition. As a result of this adherence the particles of metal build up and often form a lump on the mandrel supporting rod which must be removed to avoid liability of damage to the apparatus. If this built up lump is not removed at the proper time serious trouble may result.

In view of the foregoing, this invention has, as an object, the provision of instrumentalities for rendering non-adherent any molten metal or particles which may become separated from the welding edges immediately the particles are formed and before they can come into contact with any other surface to which they might adhere. One method of achieving this object is to chill the molten bits of metal immediately they are given off from the welded edges to harden them.

A further objective which is intimately associated with the one set out in the preceding paragraph is to provide means for removing the chilled or hardened particles immediately upon their formation. These ends are attained in the apparatus herein illustrated by employing a tubular or hollow member as the mandrel support and availing of the bore in this member as a conduit for a fluid blast, such as air. This blast chills the molten particles and at the same time blows the major part of the waste particles out past the mandrel. A small amount of these chilled particles may be exhausted through the seam cleft, but in the main they are gotten rid of through the medium of the open tube.

A more detailed feature of the invention resides in the manner of perforating the mandrel supporting tube adjacent the mandrel. By forming the upper portion of the tube with perforations which are inclined forwardly, the direction of the blast is controlled to give the most effective and desired results.

With these and other more detailed objects and advantages in view, as will in part become more apparent, and in part be hereinafter stated, the invention comprises certain new methods, and novel constructions, combinations, and arrangements of parts as will be subsequently specified and claimed.

For a full and more complete understanding of the invention references may be had to the following descrption and accompanying drawings wherein:

Figure 1 is a plan view of tube making apparatus including tube forming and electrical welding means, with the instant invention applied thereto.

Figure 2 is a vertical section taken about on the line 2—2 of Figure 1.

Figure 3 is a detailed showing of a hollow mandrel supporting rod made in accordance with the invention.

Figure 4 is an enlarged detail illustration of the end of the mandrel support with the mandrel affixed thereon; and Figure 5 is an end view of the mandrel shown in Figure 4.

In the drawings, a support for the tube fashioning mechanism is indicated at A. The fashioning, bending, and forming rollers and mechanism as well as the electric welding apparatus, are of a well known construction and only as much of these parts as is essential to afford a proper setting up of tube apparatus including this invention will be here described.

At one end the support A is provided with guides 1 for the strip of metal which is fed into the tube forming rollers and designated 2. Adjacent to the guides 2 are forming rollers 3 and 4 which operate on the strip 2 just after the latter leaves the guides 1 to impart thereto a trough-like shape. A series of pairs of roller members R1, R2, and R3 are arranged to operate on the bent strip subsequent to its leaving the forming rollers 3 and 4. The pairs of rollers R1, R2, and R3 are spaced progressively a lesser distance apart so as to gradually bend the metal strip into a tubular cross-sectional shape with a gap or seam cleft extending along the top thereof. These rollers are disposed horizontally in contrast to the vertical disposition of the rollers 3 and 4 and their cylindrical surfaces are grooved or curved as shown in Figure 2, this to conform to the shape of the tube.

The partially finished tube, after it passes the rollers R1, R2, and R3 is received between the vertically positioned rollers 5 and 6. The latter have their cylindical surfaces curved to accommodate the tube but the upper roller 6 is provided with a rib 7 along the bottom of the trough defining its periphery and this rib 7 enters the seam cleft in the partially finished tubing and inhibits rotation of the latter while it is being operated on by the electrical welding means.

The welding apparatus comprises a pair of roller-like electrodes 8 which are maintained in spaced relation by insulation indicated at 9. The electrodes 8 are in engagement with the edges of the seam gap at opposite points and when electric current of great amperage and small voltage is passed through the electrodes across the seam cleft the edges are heated to a welding temperature and are pushed together to effect the welding required.

Any suitable driving means (not shown) of conventional construction may be provided for operating the various rollers and electrodes and to properly move the metal strip through the various instrumentalities operating thereon.

A mandrel 10 is positioned in the partially completed tube past the electrodes at the rollers shown at R5 and this mandrel is provided with rollers shown at 11 to eliminate to as great an extent as possible, friction with the tube. The rollers 11 serve to roll down the metal at the seam after welding and while still hot. The mandrel 10 is formed with a threaded stud portion 12 which is threaded into one end of a tubular supporting member 13. A key 14 may be availed of to render more secure the connection between the mandrel 10 and tube 13.

The tube 13 is perforated on its upper side with openings inclined at a suitable angle, say 30°, and shown at 15. The tube 13 extends backwardly past the rollers R1, R2, and R3 to a point where it terminates in anchoring means including the solid member 16. Close to the rear end of the tubular part of the mandrel support the member 16 is provided with a conduit 17 which projects beyond the cylindrical surface of the member 16 and has connected thereto one end of an air line 18.

The member 16 tapers down to a shank 20 in which is an opening 21 designed to receive a key 25 after the shank 20 has been passed through an opening 22 in a cross member 23 which is held in position on the support A by the structure indicated at 24. The continuous forward movement of the tube, and this tension, together with the cross member 23 and key 25, maintains the mandrel in proper position.

When the apparatus is operating as intended, an air blast is let into the tube 13 by the air line 18. This blast escapes through the perforations 15 and renders non-adherent any molten metal which may fall from the heated edges by chilling and hardening the separated molten metal. At the same time, the chilled particles are blown out past the mandrel 10 which is cut away to permit of the passage of the blast. Some small portion of the latter may pass through the open seam cleft before it is closed by the welding.

Claims—

1. In apparatus for manufacturing tubing from strip metal, the combination of means for forming a strip into the shape of a tube, means for heating and welding the edges of the strip to complete the tube, and fluid pressure means for chilling any metal particles which may fall from the heated portion of the tub into the interior thereof.

2. In combination, means for heating and welding opposed edges of a metal strip to form a tube, and means for directing a current of fluid outwardly between the edges of the strip adjacent the point at which welding takes place.

3. The combination of a welding machine having electrodes for resistance welding a tube having a longitudinally extending seam gap, and a conduit positioned to discharge fluid under pressure outwardly from within the tube and through the seam gap just before the same is welded.

4. The combination of a machine having electrodes for the resistance welding of metal tubing having a longitudinally extending seam gap, and means for discharging fluid under pressure within the tube and toward the gap a short distance in front of the electrodes.

5. In the manufacture of tubing, the process of progressively heating and welding the opposed edges of metal tubing having a longitudinally extending seam gap, and directing a current of fluid outwardly through the seam gap in advance of the point at which welding takes place.

6. In the manufacture of tubing, the process of progressively welding the opposed edges of metal tubing having a longitudinally extending seam gap, and directing a stream of fluid under pressure outwardly through the seam gap and longitudinally through the tube.

In testimony whereof I hereunto affix my signature this 12th day of August, 1929.

HERBERT V. LECKIE.